United States Patent [19]

Bartosiak et al.

[11] Patent Number: 5,011,296
[45] Date of Patent: Apr. 30, 1991

[54] METHOD OF USING INFRARED THERMOMETER WITH REMOTE FIBER OPTIC PICKUP

[75] Inventors: George Bartosiak, Naperville; Christopher Siskovic, Libertyville; Henry H. Tap, Algonquin; Sam Paris, Chicago; Arthur E. Goldberg, Evanston, all of Ill.

[73] Assignee: Square D Company, Palatine, Ill.

[21] Appl. No.: 470,271

[22] Filed: Jan. 25, 1990

Related U.S. Application Data

[62] Division of Ser. No. 296,225, Jan. 12, 1989, Pat. No. 4,919,505.

[51] Int. Cl.$^5$ .............................. G01J 5/10; G01J 5/08
[52] U.S. Cl. ..................................... 374/131; 374/130; 350/96.18; 350/96.23
[58] Field of Search ............... 374/121, 124, 127, 130, 374/131, 132, 139, 159, 160, 161; 250/227; 350/96.10, 96.15, 96.20, 96.18, 96.23, 96.29, 96.30, 96.25, 96.26; 356/43

[56] References Cited

U.S. PATENT DOCUMENTS

| | | | |
|---|---|---|---|
| 2,968,946 | 1/1961 | Goldberg et al. | 356/47 X |
| 3,311,747 | 3/1967 | Smith, Jr. et al. | 350/96.18 X |
| 3,745,834 | 7/1973 | Veltze et al. | 374/139 X |
| 4,021,663 | 5/1977 | Takahashi | 250/227 |
| 4,118,985 | 10/1978 | Compton | 374/131 |
| 4,153,333 | 5/1979 | Harada et al. | 350/96.26 |
| 4,494,881 | 1/1985 | Everest | 374/130 |
| 4,527,896 | 7/1985 | Irani et al. | 374/133 |
| 4,533,243 | 8/1985 | Zhukov et al. | 350/96.15 X |
| 4,650,318 | 3/1987 | Pointer et al. | 374/125 |
| 4,657,385 | 4/1987 | Pointer | 374/130 |
| 4,664,515 | 5/1987 | Imura et al. | 374/130 |
| 4,676,592 | 6/1987 | Nishioka et al. | 350/96.26 |
| 4,737,038 | 4/1988 | Dostoomian | 374/139 |
| 4,770,528 | 9/1988 | Imura et al. | 374/130 |
| 4,815,841 | 3/1989 | Bickler et al. | 374/131 |
| 4,867,574 | 9/1989 | Jenkofsky | 374/130 |

FOREIGN PATENT DOCUMENTS 2130717 6/1984 United Kingdom ............... 374/131

Primary Examiner—Thomas B. Will
Assistant Examiner—Diego F. F. Gutierrez
Attorney, Agent, or Firm—Michael J. Femal; James W. Potthast

[57] ABSTRACT

An infrared thermometer (10) with a fixed aperture (99), focusable remote pickup head (12) conveys infrared light (16) from a target (14) to a photosensor (52) of a defocused sensor head (20). The remote pickup head (12) has a reimaging lens (84) and means for selectively adjusting the focus of the lens (84) relative to the target (14) after the pickup head has been fixedly mounted. The aperture setting is kept fixed during the focus adjustment to eliminate the need to recalibrate after the focus adjustment. The defocused sensor head (20) has a defocused relay lens (50) which is selectively out of focus to convey a slightly blurred, out of focus image of the output end of the fiber optic cable (18) to the photosensor (52) to reduce noise, average the light signal and reduce calibration difficulties due to high intensity spots in the image field and to make the unit less susceptible to misfocusing. Precision is further enhanced by provision of a field stop member (86) with a narrow slot, for instance, for passing light only to selected parts of the input end of the fiber optic cable (18) which makes up the optical field.

12 Claims, 3 Drawing Sheets

METHOD OF USING INFRARED THERMOMETER WITH REMOTE FIBER OPTIC PICKUP

CROSS REFERENCE TO OTHER APPLICATIONS

This is a divisional of application Ser. No. 07/296,225 filed Jan. 12, 1989, now U.S. Pat. No. 4,919,505.

BACKGROUND OF THE INVENTION

Infrared thermometers are well known instruments for remotely determining temperature when it is neither possible nor practical to use a direct temperature sensing probe. The infrared light emitted by a target is transmitted to a photosensor which converts the light to electrical signals that are then processed or analyzed for conversion into a visual indication of temperature.

Reference can be made to U.S. Pat. Nos. 2,968,946 of Goldberg et al.; 4,527,869 of Irani et al. and patents and other references cited therein for a more detailed description of such infrared thermometers.

More recently, infrared thermometers have been developed which employ fiber optic cables to transmit light from a remote pickup head containing a fixed focus reimaging lens system to a photosensor of a sensing head which converts the light to electrical signals. These signals are then passed to a processor, or analyzer, which converts the electrical signals to a visual indication of temperature.

These fiber optic infrared thermometers have some disadvantages which hinder their use or interfere with their accuracy. Know remote pickup heads have employed fixed focus lens systems, such that if it is desired to focus on a different target, the entire remote pickup head must be moved relative to the target. This requires relative crude adjustment of the mounting mechanism which holds the remote pickup in place each time it is desired to change focus and renders set up of the instrument difficult. Alternatively, remote pickup heads have been provided which allow for adjustment of the focus but only at the expense of destroying calibration during the adjustment process.

Another problem has been due to the fact that at the sensor head, the light from the end of the fiber optic cable from the target is passed to the photosensor by means of a lens system focused directly on the photosensor. This results in sensitivity and calibration difficulties due to high intensity spots at the end of the fiber optic cable and resultant calibration problems due to improper focusing.

Known fiber optic infrared temperature sensors also lack provision of a selectable field stop, such as an elongated slot shaped field stop. Accordingly, in these sensors the target's selectivity cannot be improved by arranging to have the light from only a selected portion of the entire field of focus impinge on the fiber optic cable and, thus, on the photosensor.

SUMMARY OF THE INVENTION

It is therefore the principal object of the present invention to provide a method using an infrared thermometer with remote fiber optic pickup which overcomes the disadvantages and problems of known infrared thermometers.

The object of the invention is achieved, in part, through provision of a method of using a remote infrared thermometer to determine the temperature of an target comprising the steps of mounting an analyzer at a first location remote from the target to provide an indication of temperature based on electrical signals from a photosensor head electrically connected therewith, mounting the photosensor head at a location remote from the target, mounting a focusable lens assembly with a preselected aperture at a fixed location with respect to the target but within focusable range of the target, adjusting the focusable lens assembly while keeping said aperture fixed after the assembly is mounted at said fixed location to focus the lens assembly on a selected target, and passing the light from the lens assembly to a remote photosensor of the photosensor head via an elongated fiber optic cable for conversion thereby to corresponding electrical signals representative of the light from the target on which the lens assembly is focused.

The objective is also achieved through provision of a method of using a remote infrared thermometer to determine the temperature of a target, comprising the steps of transmitting light from a lens system focused on a target through an input end of a fiber cable, receiving the focused light from an output end of the fiber optic cable at a sensor location remote from the target and lens system, passing the light from the output end of the fiber optic cable to a photosensor at the sensor location through a relay lens which is slightly unfocused with respect to the photosensor to slightly blur the image of the output end of the fiber optic cable relayed to the photosensor, and converting electrical signals produced by the photosensor in response to the blurred image to an indication of temperature.

BRIEF DESCRIPTION OF THE DRAWINGS

The foregoing objects and advantageous features of the present invention will be described and other objects and advantageous features will be made apparent from the detailed description of the preferred embodiment which is given below with reference to the several figures of the drawing, in which.

DETAILED DESCRIPTION

Figure 1:
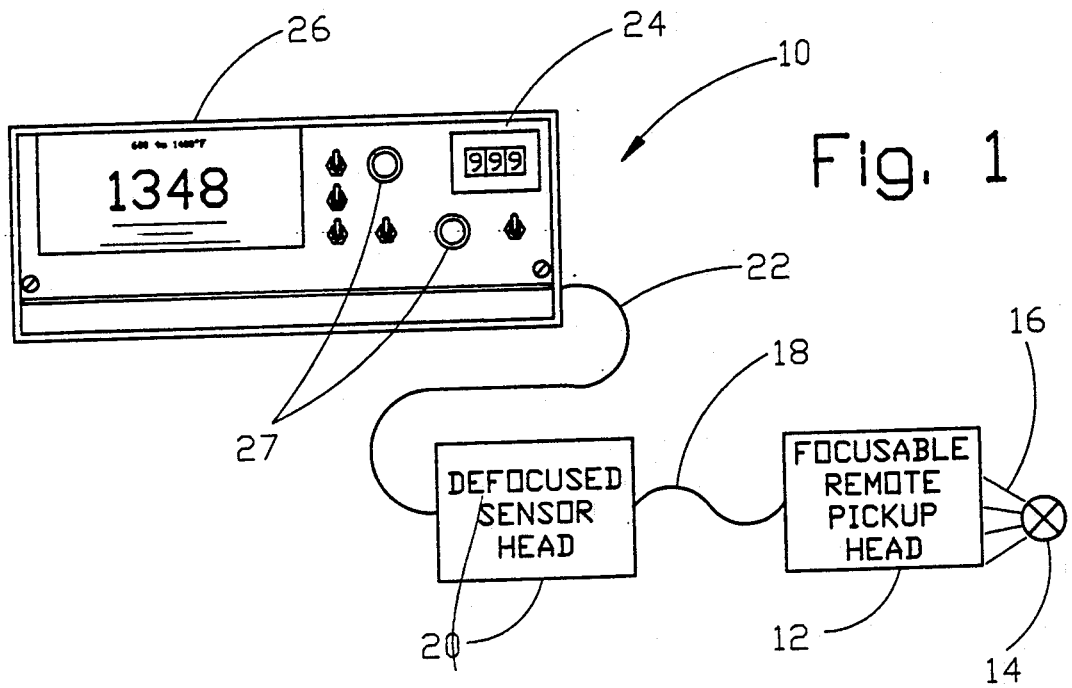
FIG. 1 is a block diagram of the remote infrared thermometer with fiber optic remote pickup of the present invention.

Referring now to FIG. 1, the remote infrared thermometer 10 of the present invention is seen to include a focusable remote pickup head 12 for collecting light emitted by a light emitting target 14 of a temperature responsive process such as a steel or glass manufacturing process. The target is customarily a particular part of a mass of heated material which is emitting light because of its relatively high temperature. A significant portion of this light is in the portion of the light spectrum known as the infrared spectrum. The infrared light 16 is transmitted through a lens system of the focusable remote pickup head 12 to an input end of a flexible fiber optic cable 18 of approximately three to six feet in length or longer to a defocused sensor head 20. The defocused sensor head contains a photosensor circuit which responds to the infrared light received from the end of the fiber optic cable 18 to provide corresponding electrical signals representative of temperature. The electrical temperature signals are conveyed by an electrical data cable to a processing, analyzing indicator 24 which both analyzes the temperature signals to convert them to temperature and then selectively shows the temperature on a temperature display 26. Control switches 27 provide control over various indication parameters, power, etc. Alternatively, some of the processing is performed by circuitry associated with the sensor head before signals are conveyed to the indicator 24. The processing or analyzing circuitry which perform the functions of the indicator 24 forms no part of the present invention and is conventional.

Figure 2A:
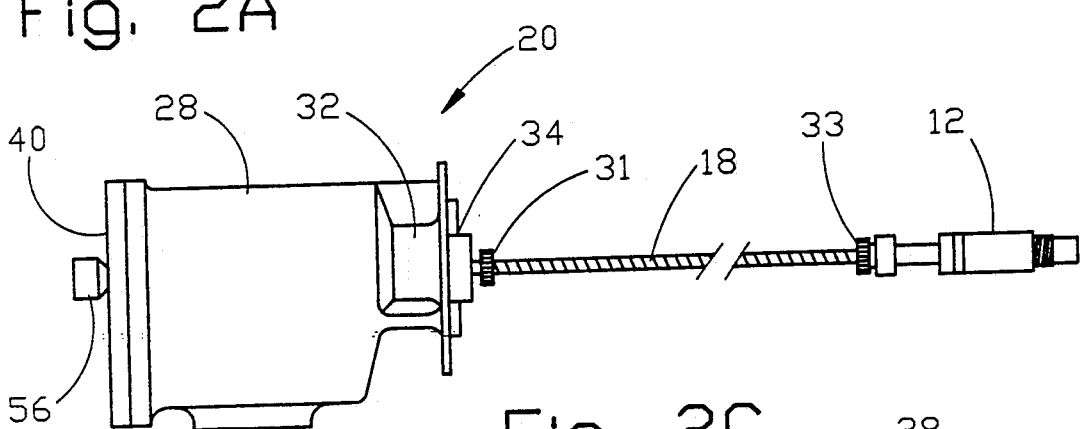
FIG. 2A is a side view of the preferred embodiment of the defocused sensor head and the focusable remote pickup head of the remote infrared thermometer of the block diagram of FIG. 1.
Figure 2B:
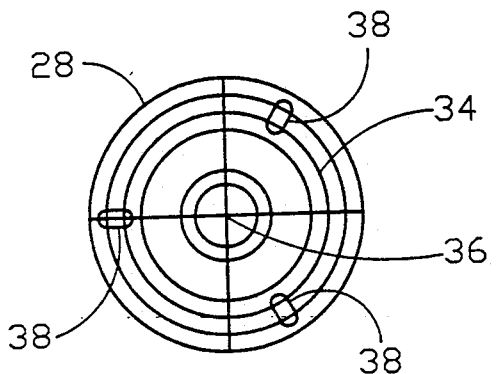
FIG. 2B is an enlarged side view of the optic aligner of the defocused sensor head of FIG. 2A.
Figure 2C:
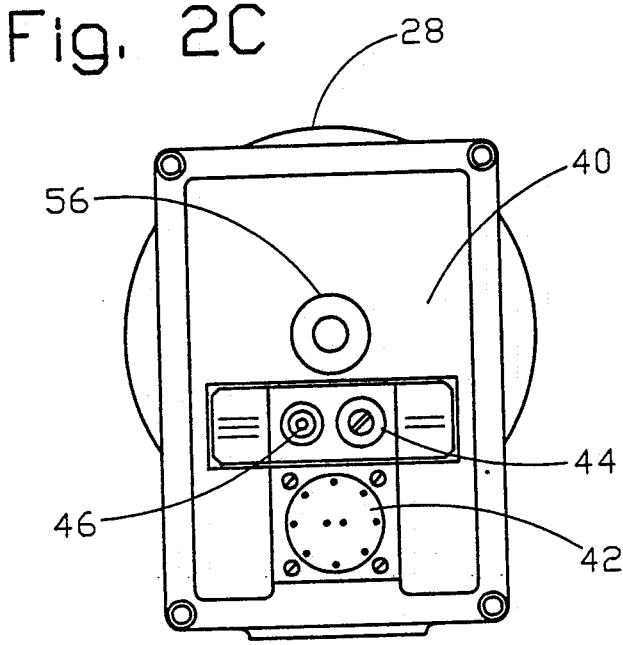
FIG. 2C is an enlarged rear view of the defocused sensor head of FIG. 2A.
Figure 2D:
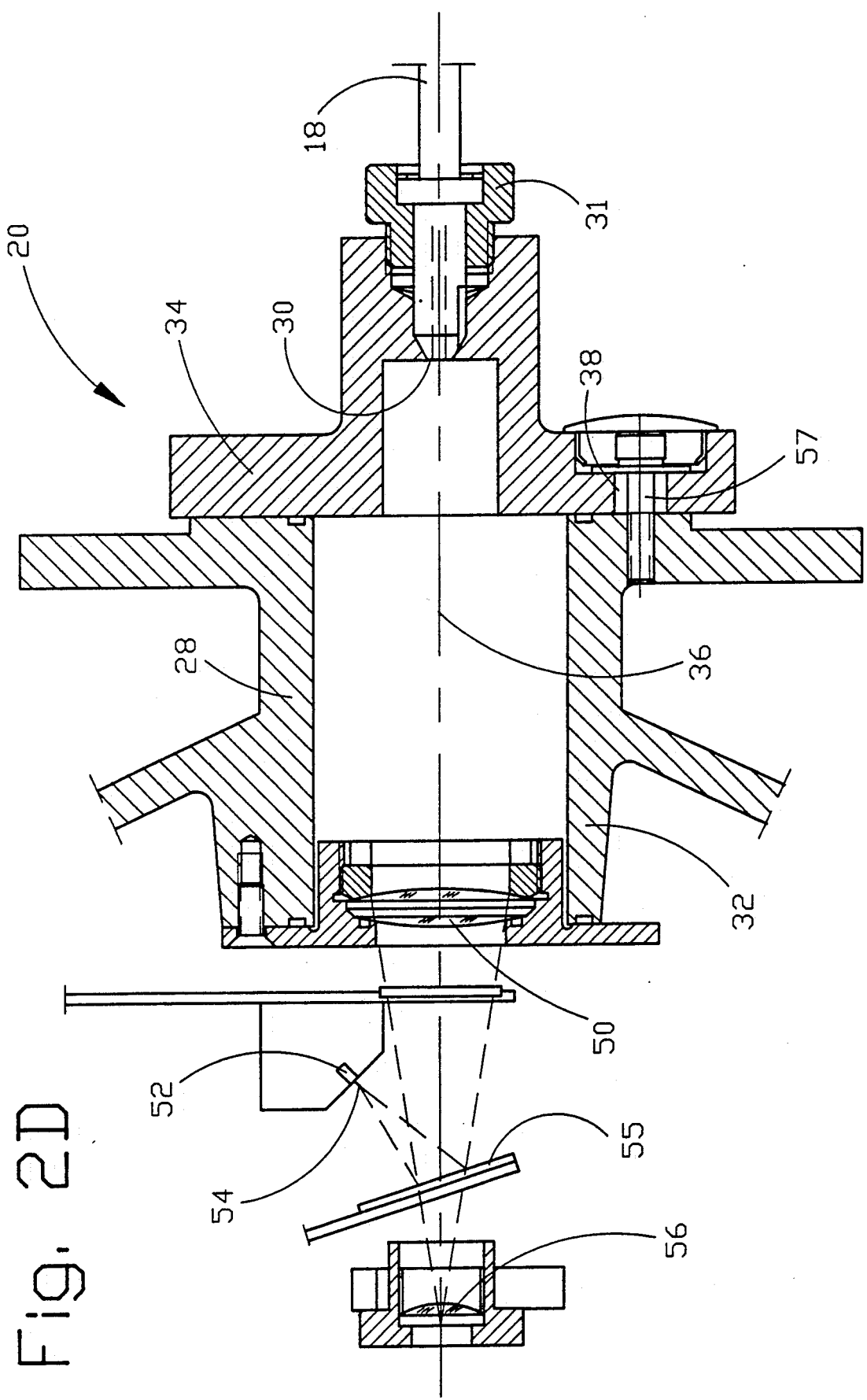
FIG. 2D is an enlarged cross sectional side view of a portion of the defocused sensor head of FIG. 2A.

Referring to FIGS. 2A, 2B, 2C and 2D, the defocused sensor head 20 has a housing 28 to which is mounted the output end 30, FIG. 2D, of the fiber optic cable 18 by means of a suitable threaded, releasible cable connector 31. The input end 77, FIG. 3B, of the fiber optic cable 18 is connected to the focusable remote pickup head 12 by a similar releasible, threaded connector 33. On the interior of a forward portion 32 of the housing 28 is located a relay lens 50 which conveys light to a photosensor element 52 protectively contained within the housing 28. Referring to FIG. 2D, in keeping with one aspect of this invention, the light from the output end 30 of the fiber optic cable 18 gathered by relay lens 50 is focused not at the electronic photosensor element 52, but, instead, is focused at a focal point 54 slightly in front of the photosensor element 52 to transmit a slightly blurred image to the photosensor element 52. This advantageously reduces noise sensitivity, averages the light signal received by the photosensor and makes the thermometer less sensitive to dimensional tolerances of the location of the relay lens 50 relative to the output end of the fiber optic cable 18. A dichroic mirror 55 reflects part of the light to the focal point 54, so light from a site 56 aligned with the focal axis of lens 50 can be passed through lens 50 and the remainder of the system for alignment purposes.

The output end 30 of the fiber optic cable 18 is held in a plane spaced from the relay lens 50 by a preselected distance to achieve the desired out of focus, or defocusing, function by means of connector 31. However, it is desired to locate the center of the output end 30 of the fiber optic cable 18 in direct alignment with the focal axis 36 of the relay lens 50. This is achieved during set up by attaching the output end 30 to the housing 28 by means of an optical aligner 34. Referring also to FIG. 2B, the aligner 34 can be adjusted radially relative to the focal axis 36 by means of three identical fasteners 57, FIG. 2D, screwed into the front end of housing 28 through radial alignment slots 38. After adjustment is made for an optimum signal, the fasteners 57 are tightened to hold the optical aligner 34 in place.

Referring also to FIG. 2C, the back 40 of housing 28 has a multipin connector receptacle 42 for connecting the photosensor circuitry to the electrical data cable 22. If the housing 28 contains some signal processing circuitry, it is also provided with an adjustment screw 44 for changing emissivity related circuit parameters of the photosensor circuit and an invalid alarm indicator 46.

Figure 3A:
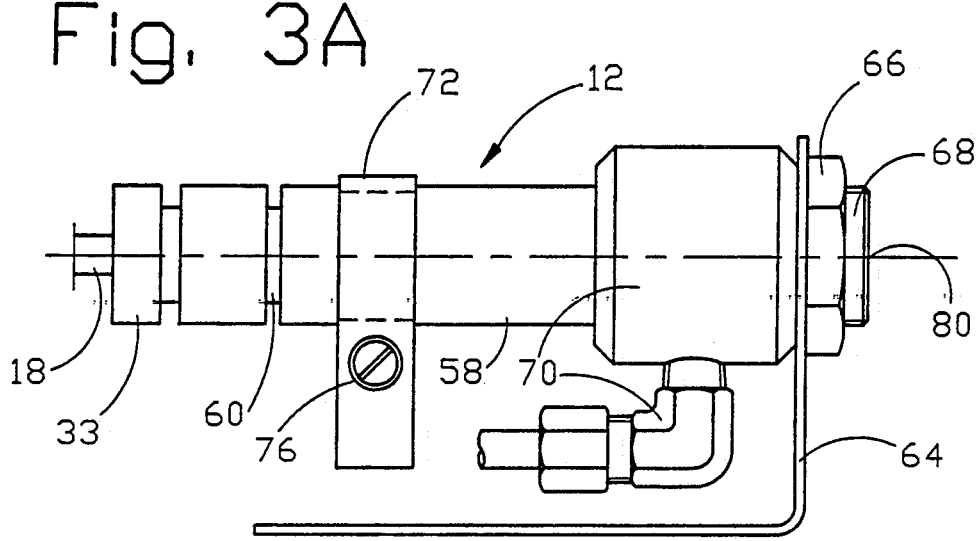
FIG. 3A is a side view of the focusable remote pickup head block diagram of FIG. 1.
Figure 3B:
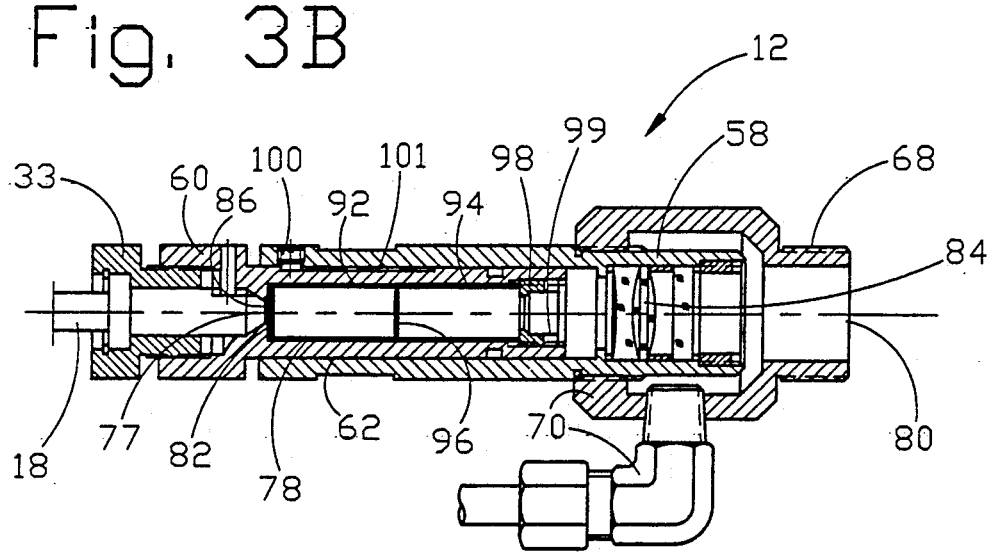
FIG. 3B is a cross sectional side view of the focusable remote pickup of FIG. 3A but with the mounting apparatus removed.

Referring now to FIGS. 3A and 3B, the remote, focusable pickup head 12 is seen to include a two part tubular housing having a relatively enlarged protective lens housing section 58 with an objective lens 84 and relatively narrow outlet port, or output port, housing section 60 received within a bore 62 in the protective lens housing section. The protective lens housing section 58 is fixedly mounted to an L-bracket 64 by means of a nut 66 secured to a forward threaded part 68 of protective lens housing section 58. Alternatively, the protective lens housing section 58 is secured by means of a strap 72 around its outer surface. A screw 76 is used to tighten the strap 72 after the housing section 58 has been placed within focusable range of the target 14. Then housing section 60 can be moved in and out to focus on the target. Also, attached to the protective lens housing section 58 is an air purge fitting 70 for passage of pressusrized clean air into the protective lens housing 58 to protect the lens 84 against dirt laden ambient air.

Referring particularly to FIG. 3B, the outlet port housing has a cylindrical bore 78 which has a light outlet port 82. The outlet port 82 is defined by a hole in the bottom of one of two cylinders 92 and 94 which are received within the bore 78 in end to end relationship. A baffle opening 96 in the closed bottom of cylinder 94 allows passage of light focused by lens 84 to be directly conveyed to the outlet port 82 at the bottom of cylinder 92. The peripheral edge of cylinder 92 abuts against the bottom of cylinder 94. A retainer 98 which is threadably fastened within the open end of bore 78 abuts against the open end of cylinder 94 to properly align the baffle opening between the light output port 82 and the lens 84. Advantageously, both cylinders 92 and 94 are substantially identical to reduce cost.

An important feature of the invention is that the retainer 98 defines a fixed aperture, or aperture stop 99 which is mounted within the outlet port housing section 60 at a fixed distance from the outlet port 82. Accordingly, the aperture 99 and not the distance between the lens 84 and the outlet port 82 determines the quantity of light being received by the fiber optic cable 18 for a given temperature of the target 14. Since the aperture remains fixed during focusing, the relationship between the light quantity and the temperature remains fixed. Accordingly, all calibration can be accomplished at the factory before focusing and the need for recalibration for different focus settings is eliminated.

In keeping with another aspect of the invention, a field stop member 86 overlies the outlet port 82 to block the transmission of light from the lens 84 to the input end 77 of the fiber optic cable 18 except for that permitted to pass through a slot formed in the field stop member 86. The field stop member alternatively has a circular field stop opening smaller than the input end of the fiber optic cable 18 to increase selectivity. In either event, the field stop member 86 is releasably held in place against the outlet port by the inlet end of the fiber optic cable 18 against which it abuts.

After the fiber optic cable 18 has been interconnected through means of connector 33 with outlet port 82 and field stop member 86 and the protective lens housing section 58 had been fixedly secured by means of strap 76 and possibly by connection with air purge fitting 70 within focusable range of the target 14, the focusable remote pickup head 12 is focused on a selected target 14. The outlet port housing 60 is slid within bore 62 to a selected position at which the light from a target 14 at a selected distance from the lens 84 and inlet end 80 is focused through outlet port 82 and field stop member 86 onto the input end of the fiber optic cable 18. Decreasing the distance between the input end of the fiber optic cable 18 and the lens 84 proportionately increases the distance between the focusable remote pickup head 12 and the target 14 and vice versa.

After focusing on the selected target 14 has been accomplished, the position of the outlet port housing 60 relative to the protective lens housing 58 is locked in place by means of a set screw 100. Measurements without recalibration are then possible because of the presence of the fixed aperture 99. The set screw 100 is threaded through a screw hole in the side of the outlet port and tightened down onto the bottom of the groove 101 extending along the side of the outlet port housing 60. Advantageously, this focusing feature enables fine focus adjustments which would not be possible by moving the mounting of the entire remote pickup head 12 relative to the target 14.

Figure 4:
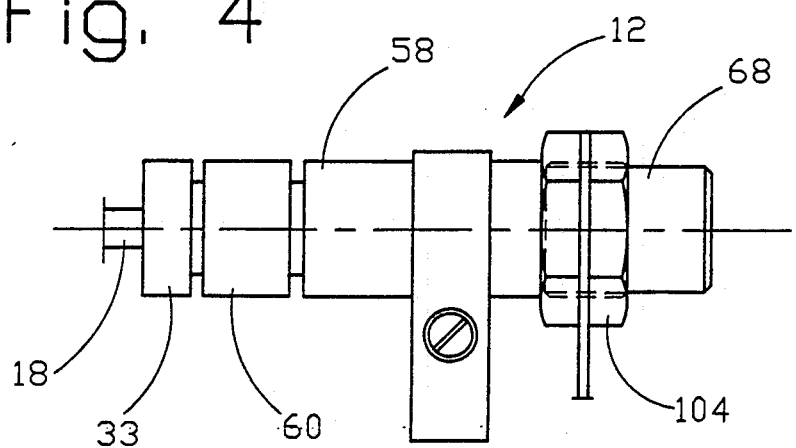
FIG. 4 is a side view of an alternate form of the focusable remote pickup head of FIG. 1 in which an air purge feature present in the pickup head of FIG. 3A has been removed.

Referring to FIG. 4, another embodiment of the sensor head is shown in which the air purge fitting 70 has been eliminated and the pickup head 12 has a mounting nut 104 fastened to the threaded part 68 of the protective lens housing 58. Otherwise, it is functionally structured identically to that shown in FIG. 3B.

While a particular embodiment has been shown and described, it should be appreciated that the breadth of the invention is not limited to this detailed description but, instead, is defined by the following claims.

We claim:

1. A method of using a remote infrared thermometer to determine the temperature of a target, comprising the steps of:

mounting an analyzer at a first located remote from the target to provide an indication of temperature based on electrical signals from a photosensor head electrically connected therewith;

mounting the photosensor head at a location remote from the target;

mounting a focusable lens assembly spaced from photosensor head and having an objective lens at a fixed location with respect to the target, and a fixed aperture at a variable location with respect to the target and within fucusable range of the target;

adjusting the focusable lens assembly while keeping said aperture fixed after said assembly is mounted at said fixed location to focus the lens assembly on a selected target; and passing the light of the target from the lens assembly to a remote photosensor of the photosensor head via an elongate fiber optic cable for conversion thereby to corresponding electrical signals representative of the light from the target on which the lens assembly is focused.

2. The method of claim 1 including the step of interposing a field stop between the focusable lens assembly and the fiber optic cable.

3. The method of claim 1 including the step of releasibly locking the focusable lens assembly against adjustment after it has been focused on the selected target.

4. The method of claim 1 including the step of calibrating the photosensor head for the fixed aperture before focusing on the target.

5. A method of using a remote infrared thermometer to determine the temperature of a target, comprising the steps of:

mounting an analyzer at a first location remote from the target to provide an indication of temperature based on electrical signals from a photosensor head electrically connected therewith;

mounting the photosensor head at a location remote from the target;

mounting a focusable lens assembly with a preselected aperture at a fixed location with respect to the target but within focusable range of the target;

adjusting the focusable lens assembly while keeping said aperture fixed after said assembly is mounted at said fixed location to focus the lens assembly on a selected target including the step of moving an input end of the fiber optic cable relative to the target while maintaining fixed the distance between the aperture and the input end of the fiber optic cable; and passing the light of the target from the lens assembly to a remote photosensor of the photosensor head via an elongate fiber optic cable for conversion thereby to corresponding electrical signals representative of the light from the target on which the lens assembly is focused.

6. The method of claim 5 in which said step of moving is done by sliding an output port housing carrying the end of the fiber optic cable within a lens housing of the lens assembly.

7. A method of using a remote infrared thermometer to determine the temperature of a target, comprising the steps of:

mounting an analyzer at a first location remote from the target to provide an indication of temperature based on electrical signals from a photosensor head electrically connected therewith;

mounting the photosensor head at a location remote from the target;

mounting the focusable lens assembly with a preselected aperture at a fixed location with respect to the target but within focusable range of the target;

adjusting the focusable lens assembly while keeping said aperture fixed after said assembly is mounted at said fixed location to focus the lens assembly on a selected target;

passing the light of the target from the lens assembly to a remote photosensor of the photosensor head via an elongate fiber optic cable for conversion thereby to corresponding electrical signals representative of the light from the target on which the lens assembly is focused said target light from the fiber optic cable passing through a defocused relay lens before relaying it to the remote photosensor.

8. A method of using a remote infrared thermometer to determine the temperature of a target, comprising the steps of:

mounting an analyzer at a first location remote from the target to provide an indication of temperature based on electrical signals from a photosensor head electrically connected therewith;

mounting a focusable lens assembly with a preselected aperture at a fixed location with respect to the target but within focusable range of the target;

adjusting the focusable lens assembly while keeping said aperture fixed after said assembly is mounted at said fixed location to focus the lens assembly on a selected target; and passing the light of the target from the lens assembly to a remote photosensor of the photosensor head via an elongate fiber optic cable for conversion thereby to corresponding electrical signals representative of the light from the target on which the lens assembly is focused, said step of passing including the steps of passing the light from the fiber optic cable through a relay lens having a focal point along a focal axis, attaching an aligner to the photosensor head, moving the aligner in a plane containing the focal point until alignment of the focal point with the end of the fiber optic cable is achieved, and locking the aligner in a fixed relationship with respect to the photosensor after alignment is achievd.

9. A method of using a remote infrared thermometer to determine the temperature of a target, comprising the steps of:

transmitting light from a lens system focused on a target through an input end of a fiber optic cable;

receiving the focused light from an output end of the fiber optic cable at a sensor location remote from the target and lens system;

passing the light from the output end of the fiber optic cable to a photosensor at the sensor location through a relay lens which is slightly unfocused with respect to the photosensor to slightly blur the image of the output end of the fiber optic cable relayed to the photosensor; and converting electrical signals produced by the photosensor in response to the blurred image to an indication of temperature.

10. The method of claim 9 in which the lens has a focal point that is located between the output end of the lens and the electronic photosensor.

11. The method of claim 10 including the steps of connecting the output end of the fiber optic cable to a sensor housing containing the sensor and relay lens, aligning the output end of the fiber optic cable with a focal axis of the relay lens after connection thereof to the housing, and locking the output end of the fiber optic cable into a fixed position relative to the focal axis after the step of aligning is completed.

12. The method of claim 9 including the step of interposing a rectangular field stop between the lens system and the input end of the fiber optic cable.

* * * * *